(12) United States Patent
Kremen

(10) Patent No.: US 7,095,539 B2
(45) Date of Patent: Aug. 22, 2006

(54) METHOD OF FORMING A THREE-DIMENSIONAL ORTHOSCOPIC IMAGE FROM ITS PSEUDOSCOPIC IMAGE

(76) Inventor: Stanley H. Kremen, 4 Lenape La., East Brunswick, NJ (US) 08816

( * ) Notice: Subject to any disclaimer, the term of this patent is extended or adjusted under 35 U.S.C. 154(b) by 0 days.

(21) Appl. No.: 10/904,920

(22) Filed: Dec. 6, 2004

(65) Prior Publication Data

US 2005/0122552 A1   Jun. 9, 2005

Related U.S. Application Data

(60) Division of application No. 09/853,790, filed on May 11, 2001, which is a continuation-in-part of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*G03H 1/30* (2006.01)

(52) U.S. Cl. .......................... 359/25; 396/330

(58) Field of Classification Search ................ 359/15, 359/19, 20, 23, 25, 26, 619, 621, 622, 458; 396/330

See application file for complete search history.

(56) References Cited

U.S. PATENT DOCUMENTS

| | | | | |
|---|---|---|---|---|
| 3,613,539 A | * | 10/1971 | Dudley | 396/661 |
| 4,082,415 A | * | 4/1978 | Brooks et al. | 359/20 |
| 4,130,337 A | * | 12/1978 | Okoshi | 359/23 |
| 5,745,267 A | * | 4/1998 | Hart | 359/35 |

* cited by examiner

Primary Examiner—Alessandro Amari

(57) ABSTRACT

A method of forming a three-dimensional orthoscopic image from a pseudoscopic image comprising preparing an integral photograph representing the pseudoscopic image, and reconstructing a three-dimensional image from that integral photograph. Since the reconstruction of a three-dimensional image from an integral photograph is pseudoscopic, and the original subject of the integral photograph is itself pseudoscopic, the reconstruction will be orthoscopic. The method uses optical and holographic fly's eye lens type arrays. The method also comprises manipulation of the elemental images of the integral photograph. An orthoscopic image will be produced if the horizontal order of the elemental images is reversed.

16 Claims, 13 Drawing Sheets

METHOD OF FORMING A THREE-DIMENSIONAL ORTHOSCOPIC IMAGE FROM ITS PSEUDOSCOPIC IMAGE

CROSS REFERENCE TO RELATED APPLICATIONS

This non-provisional patent application is a division of U.S. patent application Ser. No. 09/853,790, filed May 11, 2001 and currently pending, which in turn is a continuation-in-part of U.S. Non-Provisional patent application Ser. No. 09/749,984, filed Dec. 27, 2000 (having matured into U.S. Pat. No. 6,593,958 which issued on Jul. 15, 2003), which in turn is a continuation of U.S. patent Non-Provisional application Ser. No. 09/111,990, filed Jul. 8, 1998 (having matured into U.S. Pat. No. 6,229,562 which issued on May 8, 2001), which in turn is the non-provisional counterpart of U.S. Provisional Patent Application No. 60/051,972, filed Jul. 8, 1997. The above mentioned US patents and applications will be hereinafter called the Claimed Priority patents and applications. This application claims the benefit of and priority to all the above mentioned Claimed Priority patents and applications. All of the above mentioned Claimed Priority patents and applications are incorporated by reference herein in their entirety thereto.

BACKGROUND OF THE INVENTION

The Claimed Priority patents and applications disclose and claim a SYSTEM AND APPARATUS FOR THE RECORDING AND PROJECTION OF IMAGES IN SUBSTANTIALLY 3-DIMENSIONAL FORMAT. The invention described therein derives from the principles of holography and/or integral photography. The Claimed Priority patents and applications first disclose a basic principle of magnification and projection. This principle permits magnification and projection of 3-dimensional images uniformly in all directions, thereby overcoming drawbacks in the prior art. The Claimed Priority patents and applications also disclose that the magnification factor can be less than, greater than, or equal to unity. Based upon this principle of magnification and projection, cameras are described, in their various embodiments, that photograph a scene and retain the 3-dimensional information therein. An editor is also described that would edit integral photographs and holograms containing the 3-dimensional information from the photographed scene. In addition, a theater is designed to project the magnified 3-dimensional scene that was photographed, upon a large screen to be viewed by an audience. Further, the projectors and screens are described in their various embodiments. The viewing audience should not be able to perform any visual test to determine whether or not the projected 3-dimensional scene truly exists.

The Claimed Priority Patents and Applications mostly disclose the application of the principle of magnification and projection to integral photography. Integral photographs (or integral frames) are a collection of two-dimensional elemental images of a three-dimensional scene, each elemental image being representative of the scene from a specific viewing angle. Normally, the elemental images are arranged in a matrix on the frame, and are produced by a matrix lens array having a multiplicity of lenslets such as a fly's eye lens. The matrix lens array has the same number and arrangement of lenslets as the elemental images which they produce. Were the identical matrix lens array to be placed over the illuminated integral frame such that there is a one-to-one correspondence between all of the individual lenslets with the elemental images, a real or virtual three-dimensional image would be reconstructed.

However, three-dimensional images reconstructed from integral photographs are normally pseudoscopic. In other words, objects which should appear closer to a viewer actually appear further away, and vice versa. This would prove annoying to a viewing audience. Therefore it is an object of this invention to convert a pseudoscopic image reconstructed from an integral photograph to an orthoscopic image (i.e., a three-dimensional image that would appear normal to a viewer). This conversion process is called eversion. Eversion turns an image inside-out. An orthoscopic image is everted to form a pseudoscopic image. A pseudoscopic image is everted to form an orthoscopic image. Each eversion is the inverse transformation of the other.

SUMMARY OF THE INVENTION

The Present Invention is a method of forming a three-dimensional orthoscopic image from a pseudoscopic image that was reconstructed using an integral photograph representing the three-dimensional scene. Since the reconstruction of a three-dimensional image from an integral photograph is normally pseudoscopic, the eversion processes described herein reconstruct an orthoscopic image (i.e., being the pseudoscopic transform from a pseudoscopic image).

DETAILED DESCRIPTION OF THE PREFERRED AND ALTERNATE EMBODIMENTS

The present invention, in all its embodiments, is encompassed within a method that permits magnification of a 3-dimensional image produced from a photograph, hologram, optical system or other system or device, regardless of the medium or the method, in such a manner as to preserve the depth to height and width relationship of the image as it existed prior to magnification. This method requires the 3-dimensional image prior to magnification to be rendered as an array of 2-dimensional images by some form of matrix lens array, such as a fly's eye lens. Were this array of 2-dimensional images to be magnified by some magnification factor, and then viewed or projected through a new matrix lens array that has been scaled up from the lens array that produced the original array of 2-dimensional images, such that the scaling factor is equal to the magnification (i.e., the focal length and diameter of each lenslet must be multiplied by the same magnification factor), a new 3-dimensional image would be produced that would be magnified by the same magnification factor, and all image dimensions of the final 3-dimensional image would be proportional to the dimensions of the original image. The utility of magnifying 3-dimensional images using this method would be the ability to enlarge holograms or integral photographs or other media from which 3-dimensional images are produced, or to project still or moving 3-dimensional images before a large audience.

Figure 1:
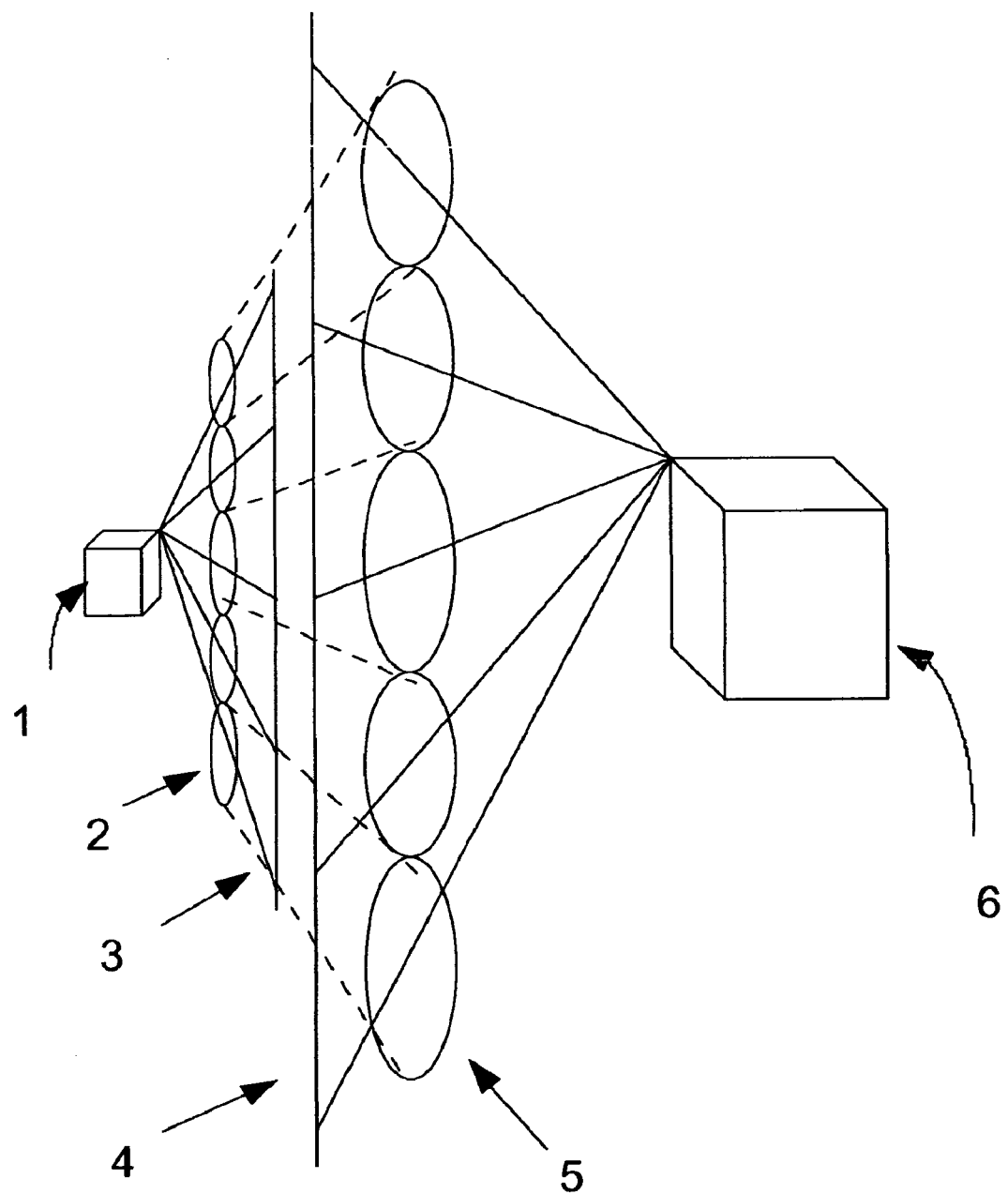
FIG. 1 illustrates the method of magnification that is the basis for both this application and the Parent application.

The magnification principle is illustrated in FIG. 1. Object 1 is photographed by matrix lens array 2, thereby producing integral photograph 3. Integral photograph 3 is then magnified to give integral photograph 4 which is then placed behind matrix lens array 5. This combination yields magnified image 6. It must be noted here, that during scaling-up, the (F/#) of the lenslets remains constant. Of course, the magnification factor need not be greater than unity (signifying image magnification). It may be a number less than one but greater than zero (signifying image demagnification), or it may be unity (signifying 1:1 or no magnification). In any case, the three-dimensional image reconstructs uniformly in correct proportion.

Figure 2:
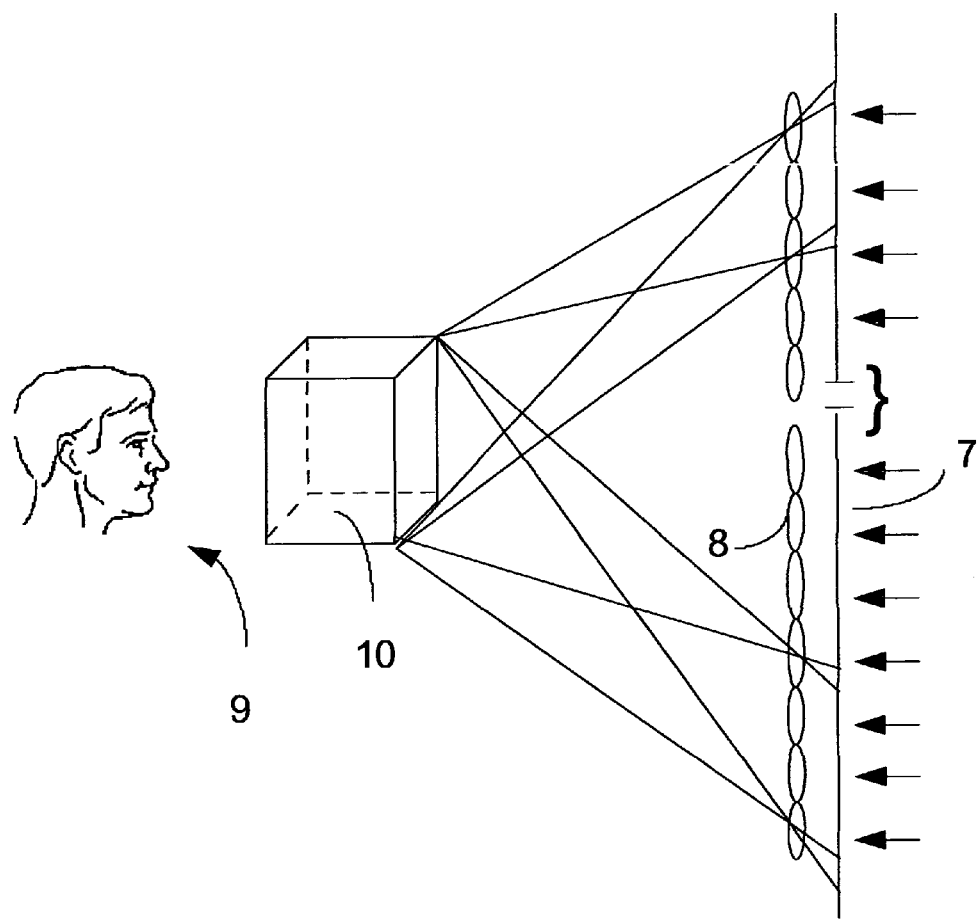
FIG. 2 illustrates how a magnified image can be projected before an audience.

Projection is merely another form of magnification. The only difference lies in the fact that no permanent record is produced as in photography. To illustrate the principle of projection, let us use as an example, the technique of rear projection shown in FIG. 2. It is also possible to illustrate this principle with front projection. Were an integral photographic transparency to be projected at some given magnification onto a translucent screen 7 which is behind a large matrix lens array 8, an observer 9 in the audience sitting in front of the matrix lens array will see the magnified 3-dimensional image 10. The 3-dimensional image can be made orthoscopic, and can be made to appear either in front of or behind the matrix lens array.

The camera comprises an optical system that would produce the 2-dimensional array of 2-dimensional images on a plane. An example of such an optical system is a matrix lens array such as a fly's eye lens arranged so as to produce a rectangular matrix array of rectangular 2-dimensional images. The image plane, for example could contain a film for recording the 2-dimensional images. Once developed, the matrix array photograph would be called an integral photograph. The camera might also be a motion picture camera capable of capturing moving 3-dimensional images in the form of a sequential series of integral photographs. On the other hand, the integral photograph (or integral frame if it is not an actual photograph) can be produced by computer graphics software or it can be drawn by an artist.

The projector comprises an optical system that would project a magnified image of the processed 2-dimensional integral photograph produced by the camera, computer, or artist onto an image plane that would be converted by the screen into a magnified 3-dimensional image. If the projector is a motion picture projector capable of magnifying moving 3-dimensional images in the form of a sequential series of integral photographs, a film motion and film stabilization mechanism would be required.

The screen consists of an optical system configured as a matrix lens array comprised of a multiplicity of optical elements. The screen could comprise refractive lenslets, diffractive lenslets, or it may be a holographic optical element. The screen has the same number of active optical elements as the matrix lens array used in the camera and configured identically as in the camera. In the preferred embodiment of the system, the matrix lens array of the screen is larger than that of the camera such that the ratio of the diameter of the screen lenslets to the diameter of the camera lenslets is equal to the image magnification. However, the (F/#) of the lenslets in the screen matrix lens array must be equal to the (F/#) of the lenslets in the camera matrix lens array.

Neither the matrix lens array of the camera nor the matrix lens array of the screen necessarily produces a spherical wavefront. The typical fly's eye lens is a matrix arrangement of lenslets. However, the principle of magnification and projection would also work if vertical parallax is eliminated. In such a case, the matrix lens array would be cylindrical lenslets arranged in a horizontal linear array. This would be similar to the Bonnet Screen or a lenticular sheet. Viewers do not need vertical parallax to see three-dimensional images. However, while horizontal "look around" would be present, vertical "look around" would be absent. In most cases, this is not a problem.

A viewing audience expects to see an orthoscopic 3-dimensional image of a scene. Orthoscopy occurs normally where a first object that is supposed to be in front of a second object appears closer to the viewer. Pseudoscopy occurs where the second object appears closer to the viewer. This is an unnatural viewing condition that would be annoying to an audience. Unfortunately, the image produced using the basic principle of magnification and projection is pseudoscopic. Therefore, optics must be used to evert from pseudoscopy to orthoscopy.

Figure 3:
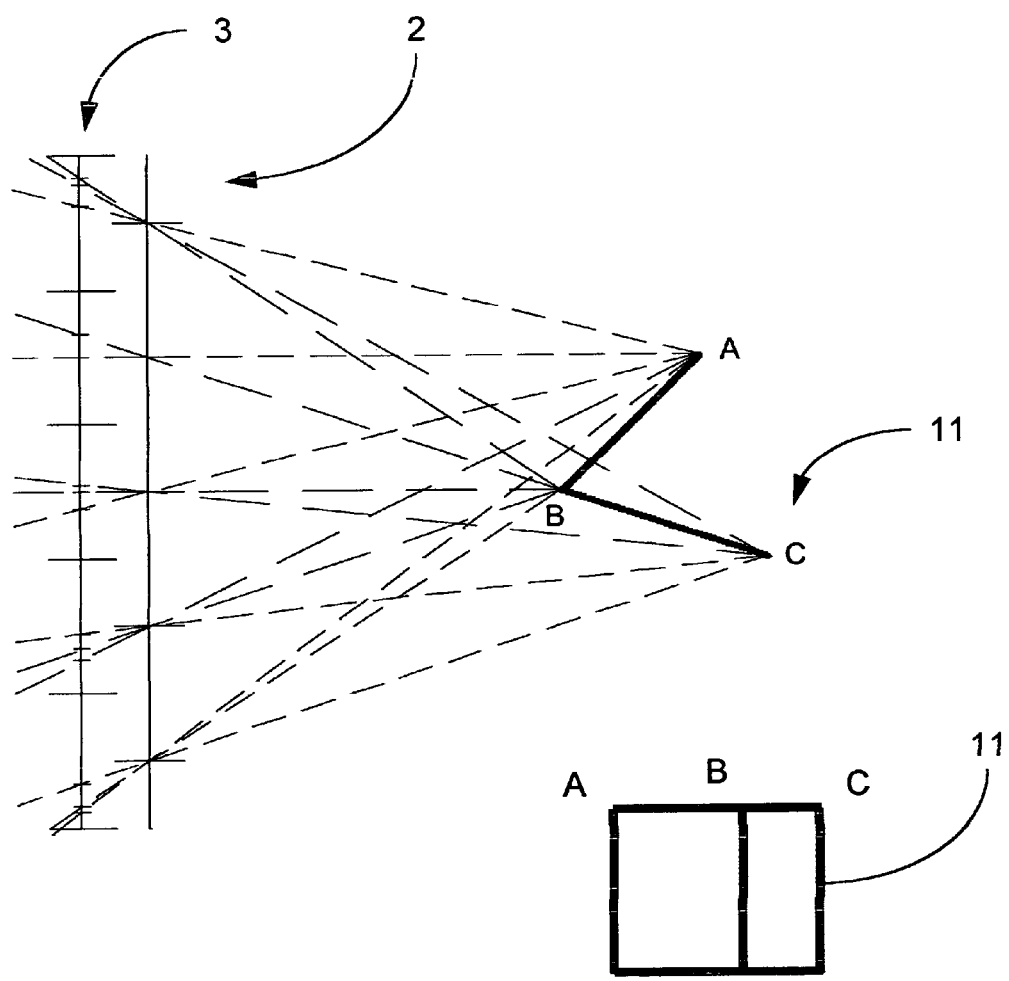
FIG. 3 is an optical ray trace showing an integral photograph formed from a three-dimensional object.

FIG. 3 is an optical ray trace showing an integral photograph formed from a three-dimensional object. All of the optical ray traces presented herein (FIGS. 3, 4, and 9–13) were created using TurboCad™ software. This software was used to create very accurate ray traces. It was also used to manipulate the integral frame as a whole as well as the individual elemental images thereof. Referring to FIG. 3, matrix lens array 2 is represented as a pinhole array to simplify the ray trace. Array 2 has five lenslets. The centers of these lenslets are represented by horizontal lines on the array. Integral frame 3 has five elemental images. Large horizontal lines on integral frame 3 separate the elemental images. Small horizontal lines on frame 3 show where rays from the three points, A, B, and C, of object 11 pass through the center of the lenslets of array 2 and form an image on frame 3. The aspect of object 11 used for the ray trace is a top plan view. Shown at the bottom right hand portion of the figure, is a front elevational view of object 11. This view is how the camera (and consequently the integral frame) sees the object. Point A is to the left, point C is to the right, and point B is between points A and C. Point B is closest to the camera while point C is farthest away.

Figure 4:
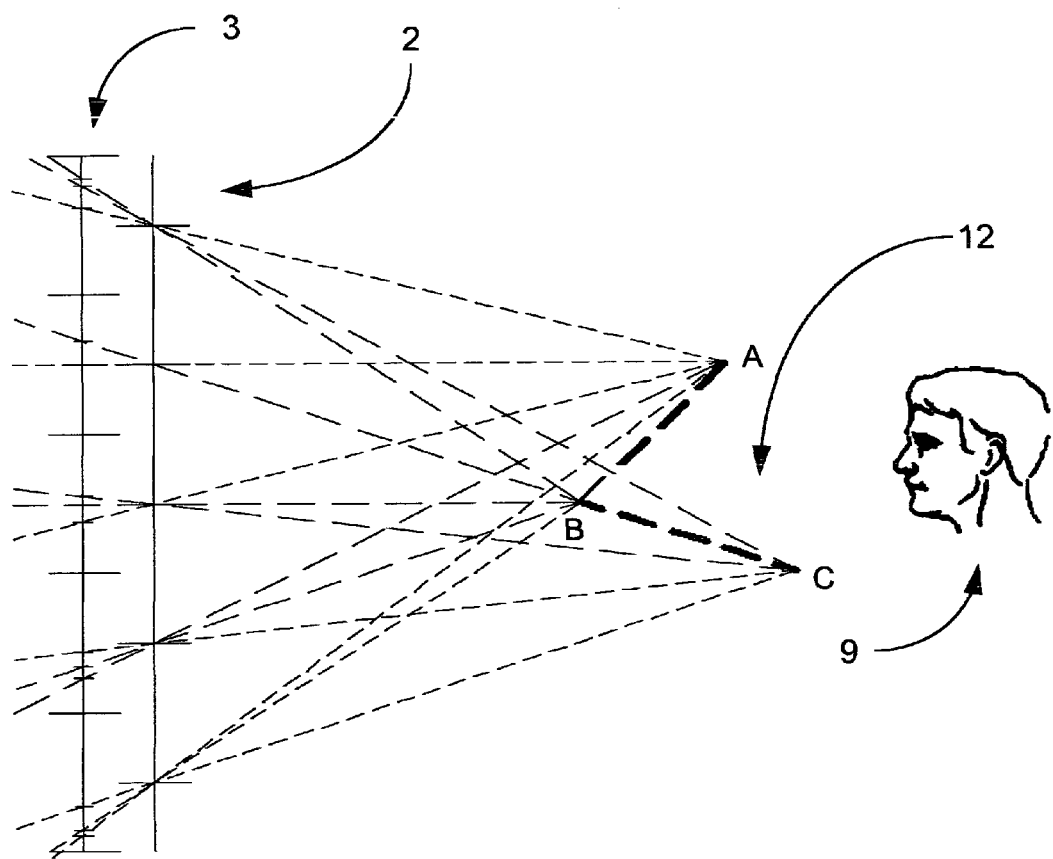
FIG. 4 is an optical ray trace showing the normal reconstruction of a pseudoscopic real image from an integral photograph when the integral photograph is placed behind the matrix lens array.

FIG. 4 is an optical ray trace showing the normal reconstruction of a pseudoscopic real image from an integral photograph when the integral photograph is placed behind the matrix lens array. The reconstruction process produces a pseudoscopic real image 12 in front of array 2. Observer 9 is looking toward array 2. If vertical parallax is absent, then the drawing of observer 9 should be a top plan view. This is consistent with the view of object 11 in FIG. 3. The drawings should show the top of the observer's head. However, the observer's face is presented in these drawings in side elevational view. This is done only to conveniently show the direction of observation.

As can be seen in the figure, point A is now seen by the observer as being to the right and point C is to the left. Point B is now farthest away from the observer while point C is nearest to him. Therefore, the image is not only pseudoscopic, but it is also left-right reversed.

Figure 5:
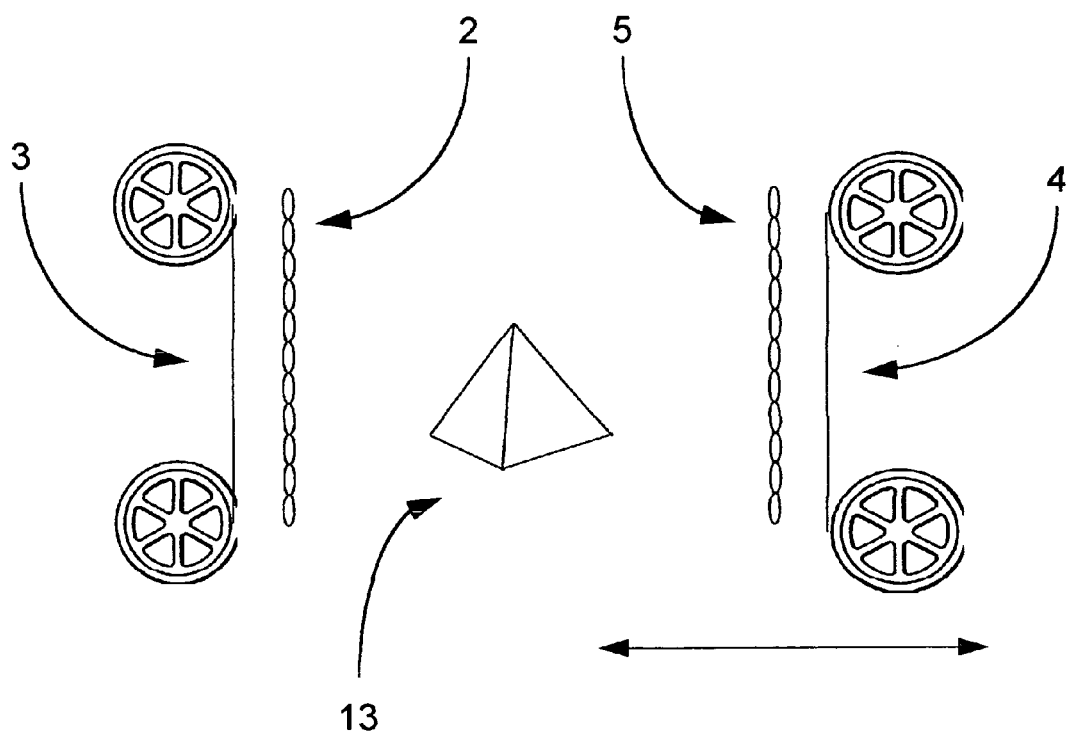
FIG. 5 illustrates the method of making a second integral photograph that will normally reconstruct an orthoscopic image of a three-dimensional object.

One method of everting a pseudoscopic image is to reconstruct the three-dimensional image in the usual manner and then to re-photograph the reconstruction with a second camera to form a second integral photograph. This is shown in FIG. 5. Pseudoscopic image 13 is produced as the reconstruction of integral photograph 3 using matrix lens array 2. The pseudoscopic image is then re-photographed using matrix lens array 5 to form a second integral photograph 4. The relative distance between the camera represented by lens array 5 and film 4 to the camera represented by lens array 2 and film 3 is variable. The reconstruction of this second film will produce a pseudoscopic image of the 3-dimensional image which was photographed. Since this image was originally pseudoscopic, the pseudoscopic reconstruction of this image would be orthoscopic. This technique has two major disadvantages. First, an intermediate processing step is required in which a second film must be made; second, there is an inherent resolution loss of $\sqrt{2}$ when going from one film to the other.

Clearly, creation of a second integral photograph is not actually required. An orthoscopic image can be reconstructed in space using a complex matrix lens array or holographic optical element.

Figure 6:
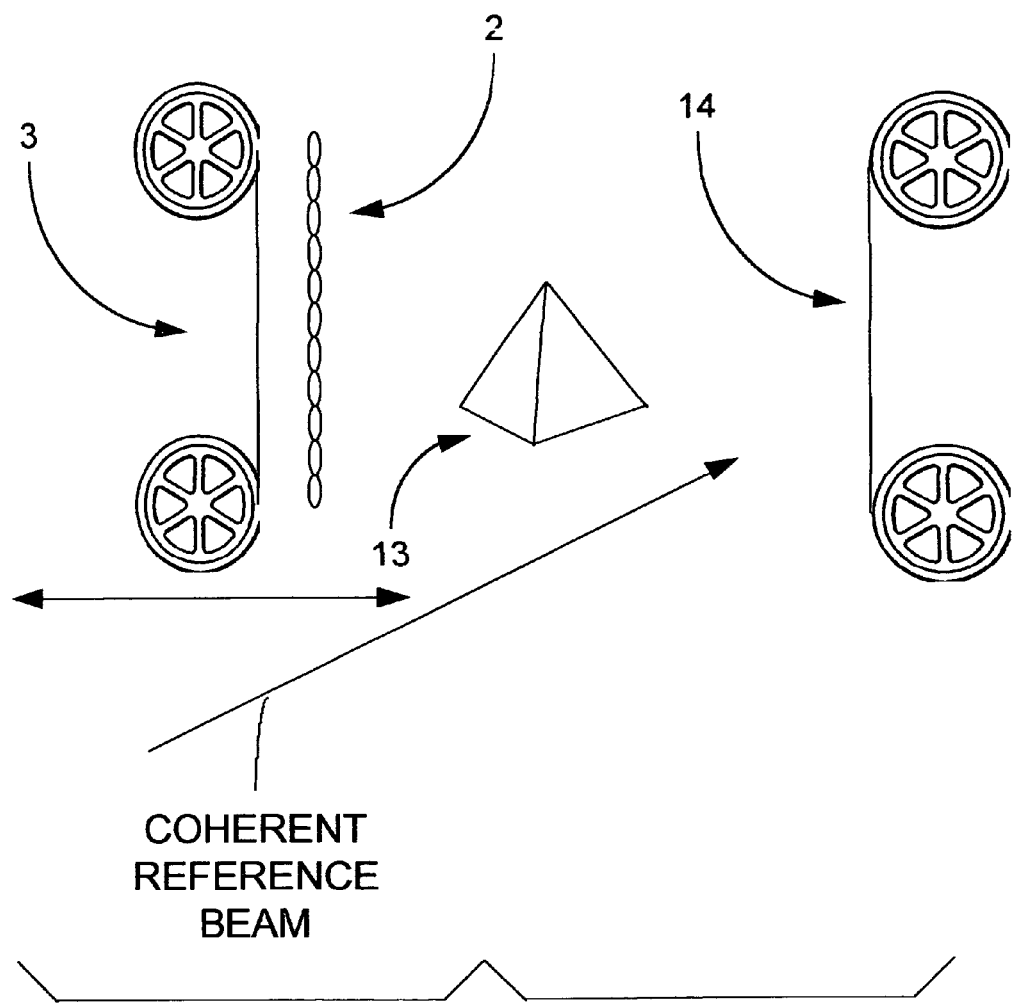
FIG. 6 shows one method of image eversion using holography and integral photography.

There are a number of variations on this method of eversion. Instead of producing a second integral photograph, a hologram may be produced of the pseudoscopic image. FIG. 6 shows how this is accomplished. Pseudoscopic image 13 is reconstructed from integral photograph 3 by illuminating it with coherent radiation that passes through lens array 2. This becomes the object beam which interferes with a coherent reference beam from the same source to produce hologram 14. The advantage of this technique is that the pseudoscopic image may be made virtual appearing behind the hologram instead of in front of the hologram.

Figure 7:
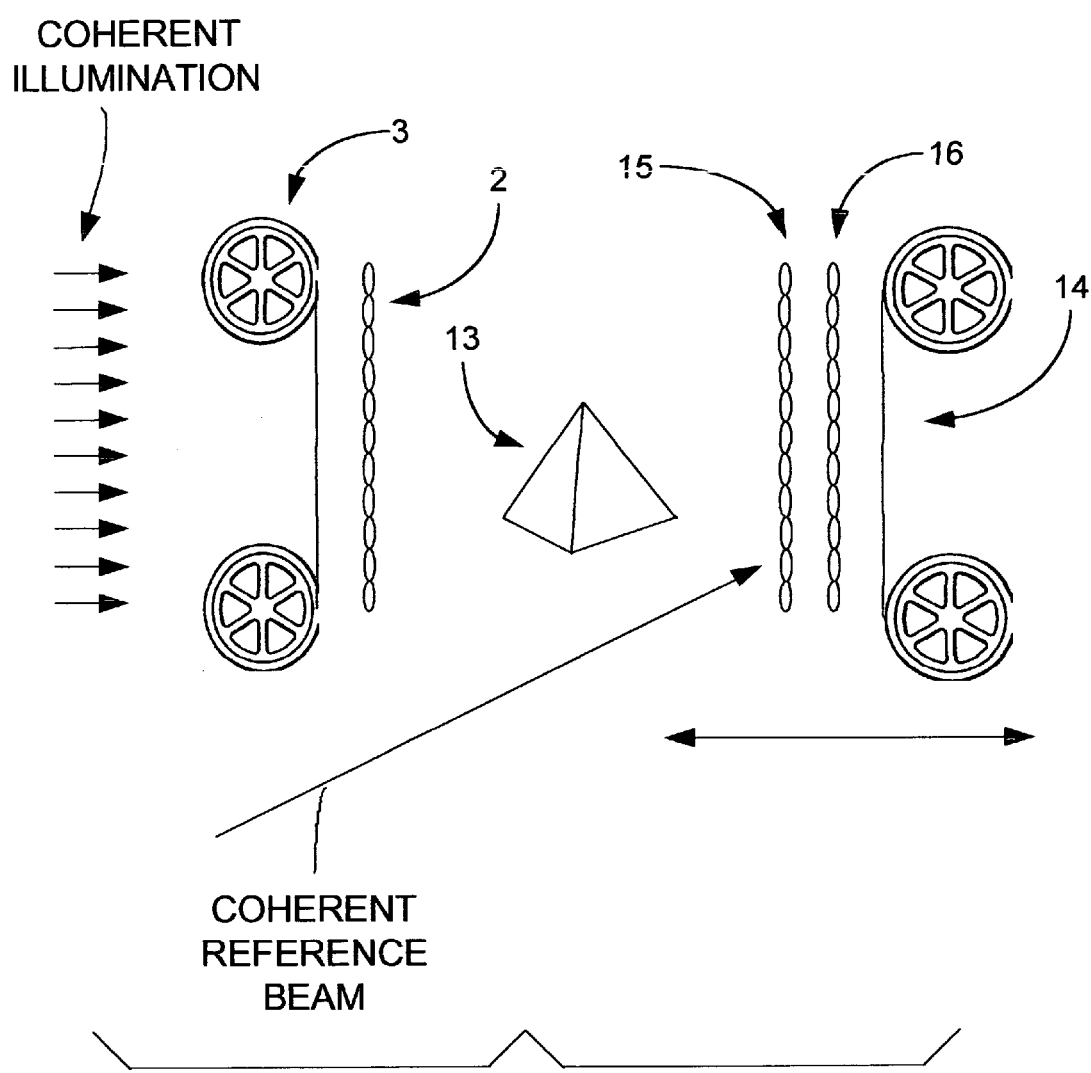
FIG. 7 shows a second method of image eversion using holography and integral photography.

Another method of eversion is shown in FIG. 7. In the figure, intearal photograph 3 is illuminated by coherent radiation which passes through lens array 2 to form pseudoscopic image 13. The coherent light from image 13 passes through lens arrays 15 and 16 to form the object beam of hologram 14. The arrow indicating the coherent reference beam is to show direction only. In the figure, it impinges upon the hologram 14 from the front. It can either pass through lens arrays 15 and 16 or not. It can also come from the rear of hologram 14. If it does not pass through the matrix lens arrays, the hologram will reconstruct an orthoscopic image viewable to the naked eye without the matrix lens arrays. Once again the relative distance between the integral photograph camera and the holographic camera is variable.

Figure 8A:
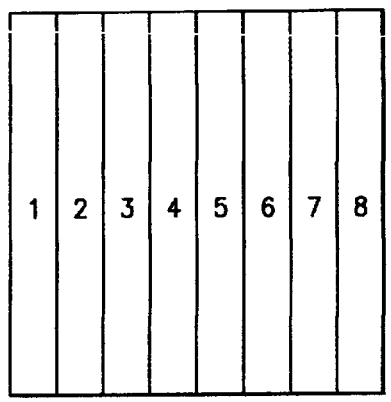
FIG. 8 shows how image eversion can be accomplished without loss of resolution by elemental image rearrangement.
Figure 8B:
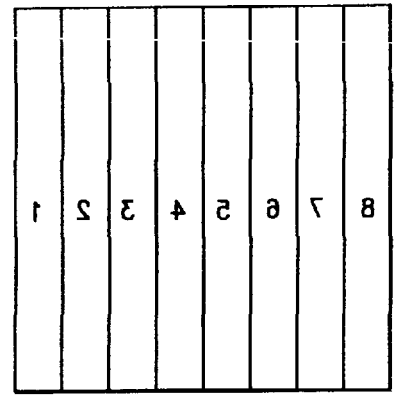
Figure 8C:
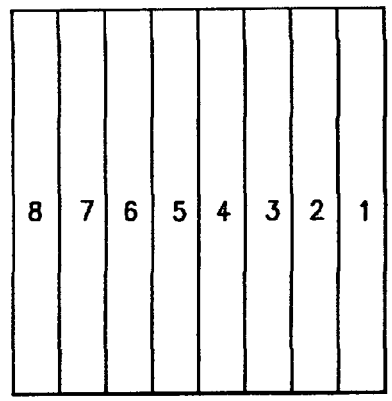

There is another basic method of producing orthoscopic images from pseudoscopic images which will not incur the resolution loss of $\sqrt{2}$. This method was described in the Claimed Priority patents and applications. The basic principle is quite simple. Referring to FIG. 8, if the film format shown in FIG. 8 (*a*) produces a pseudoscopic image, then it can be shown by an optical analysis of what a second film record would look like if the 3-dimensional image from FIG. 8 (*a*) to be photographed. The film format of FIG. 8 (*b*) would produce an orthoscopic mirror image of the pseudoscopic 3-dimensional image produced by the format of FIG. 8 (*a*), while the format of FIG. 8 (*c*) will produce a correct orthoscopic image.

Figure 9:
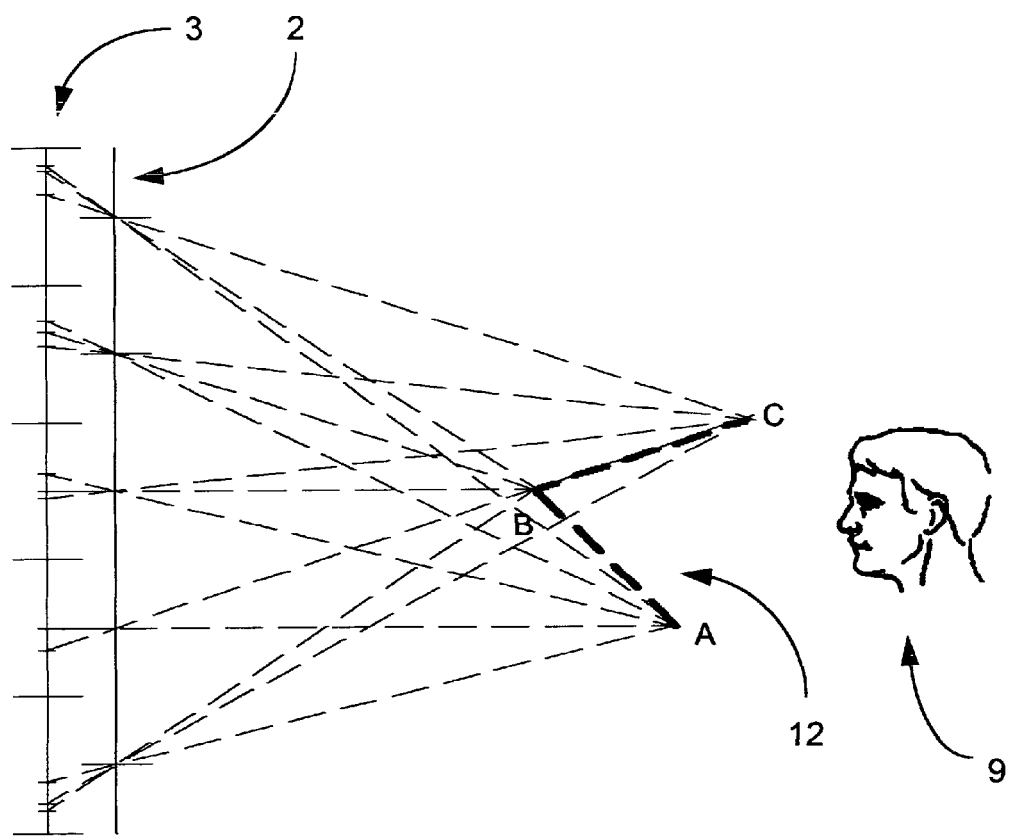
FIG. 9 is an optical ray trace schematic showing the reconstruction from an integral photograph where the entire picture is left-right reversed or rotated by 180°.

FIG. 9 is an optical ray trace schematic showing the reconstruction from an integral photograph where the entire picture is left-right reversed or rotated by 180°. Here, a pseudoscopic real image is produced that has the correct left-right orientation. Observer 9 sees point A of image 12 to the left and point C to the right. However, point C is closest to him and point B is farthest away.

Figure 10:
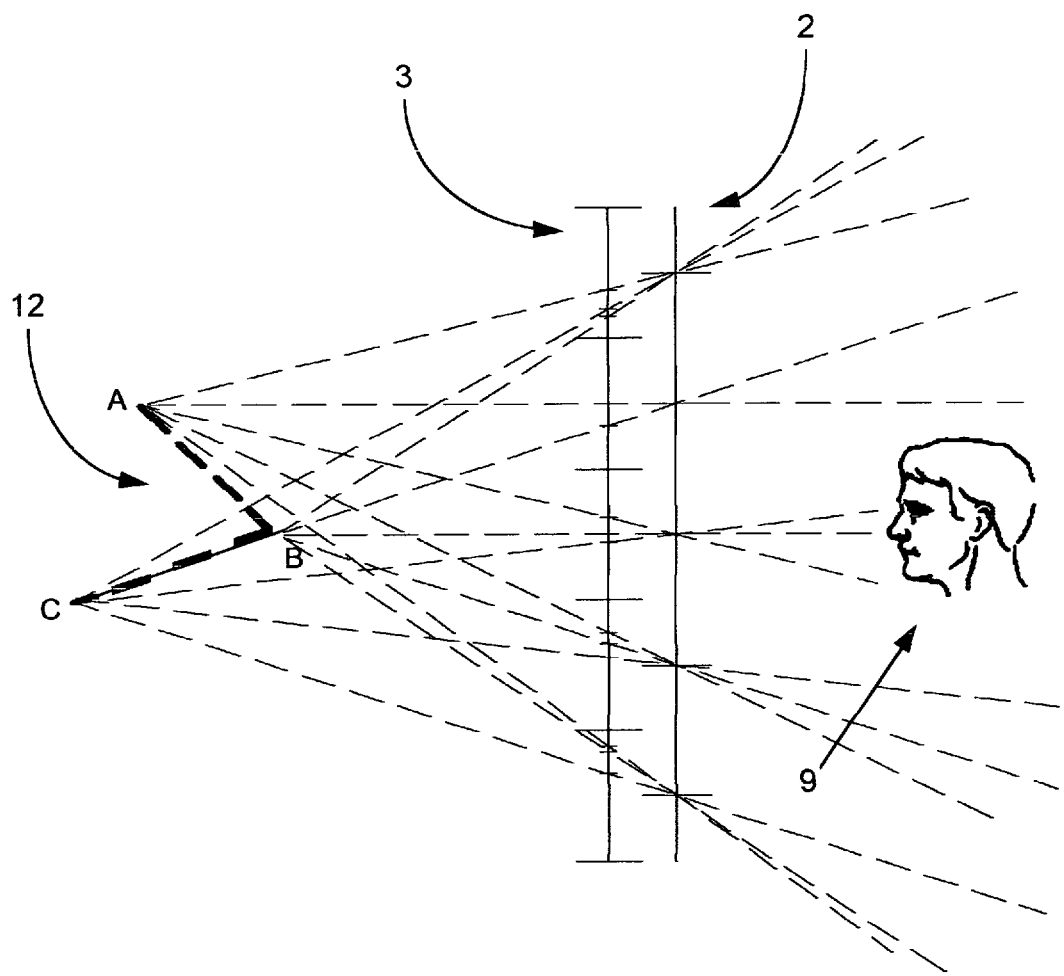
FIG. 10 is an optical ray trace schematic showing the reconstruction from an integral photograph where each elemental picture is left-right reversed.

FIG. 10 is an optical ray trace schematic showing the reconstruction from an integral photograph where each elemental picture is left-right reversed. Here, an orthoscopic virtual image is produced that is left-right reversed. Observer 9 sees point A of image 12 to the right and point C to the left. However, now point B is closest to him, and point C is farthest away.

Figure 11:
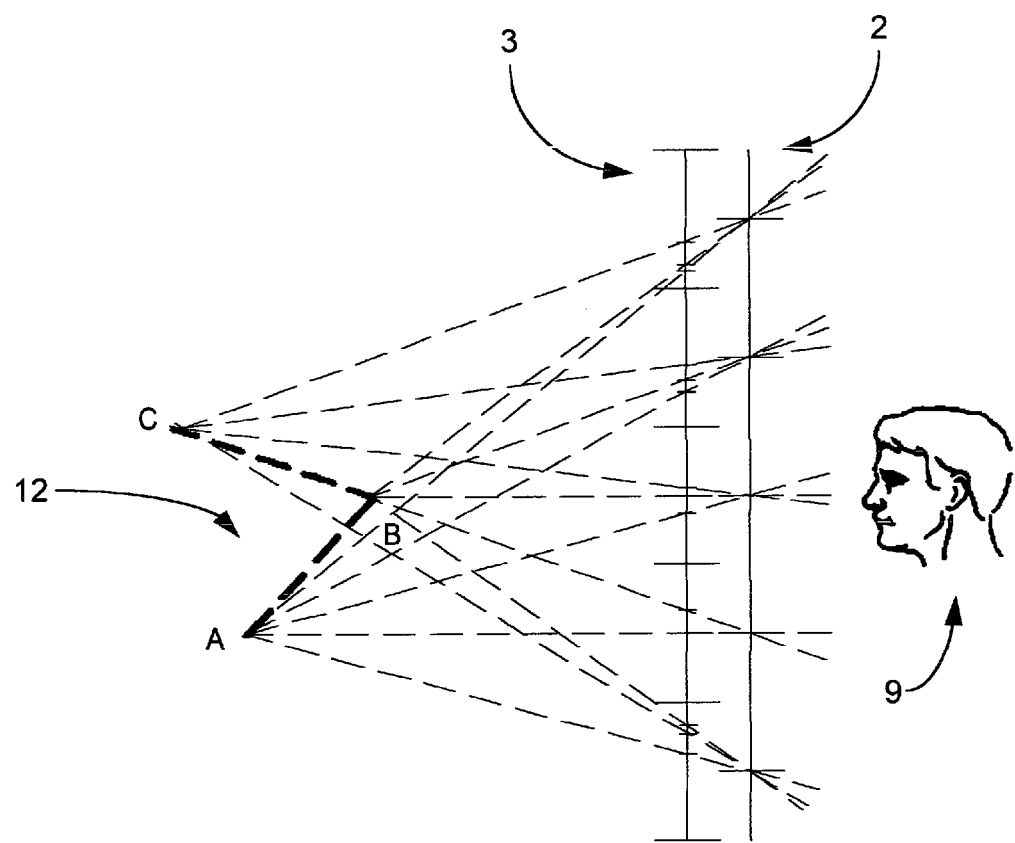
FIG. 11 is an optical ray trace schematic showing the reconstruction from an integral photograph where each elemental picture is left-right reversed, and then the entire picture is left-right reversed or rotated by 180°.

FIG. 11 is an optical ray trace schematic showing the reconstruction from an integral photograph where each elemental picture is left-right reversed, and then the entire picture is left-right reversed or rotated by 180°. This produces an orthoscopic virtual image with the correct orientation.

Figure 12:
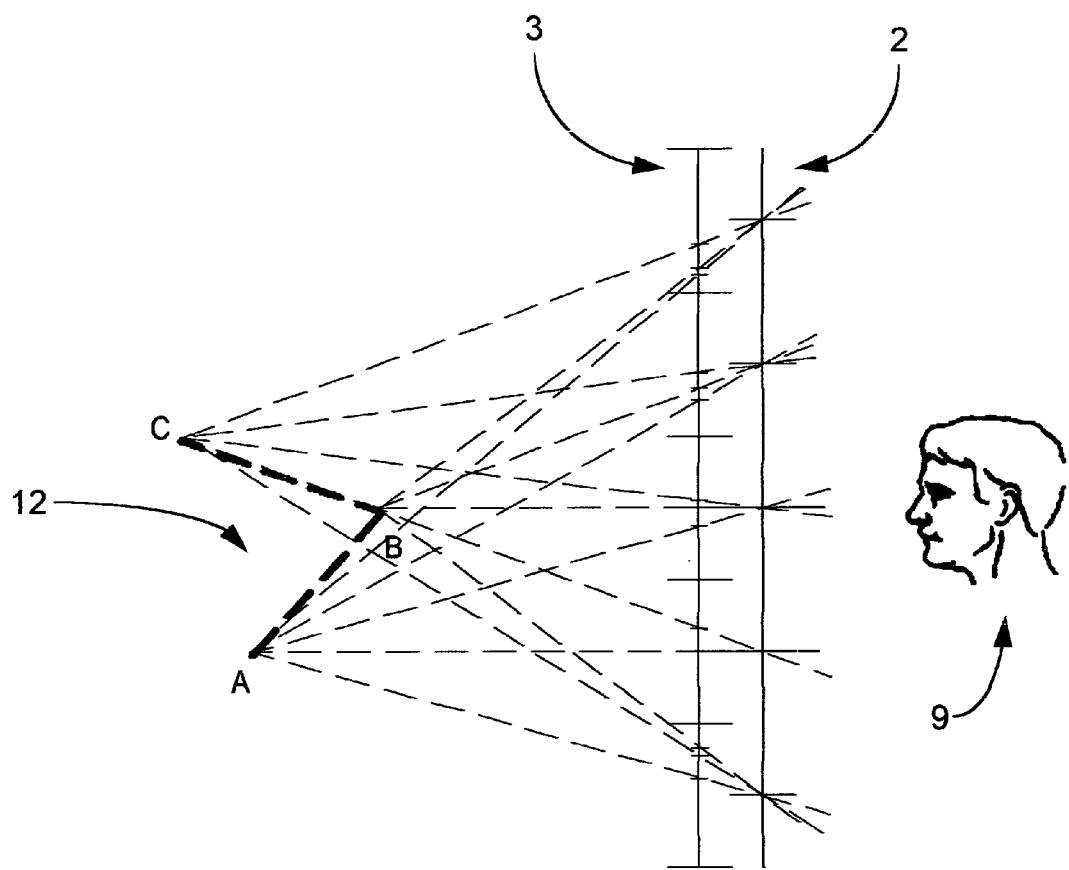
FIG. 12 is an optical ray trace schematic showing the reconstruction from an integral photograph where the order of the elemental pictures is reversed, but the original left-right orientation of each elemental picture is retained.

FIG. 12 is an optical ray trace schematic showing the reconstruction from an integral photograph where the order of the elemental pictures is reversed, but the original left-right orientation of each elemental picture is retained. This also produces an orthoscopic virtual image with the correct orientation. The image produced here is identical to that reconstructed in FIG. 11.

Figure 13:
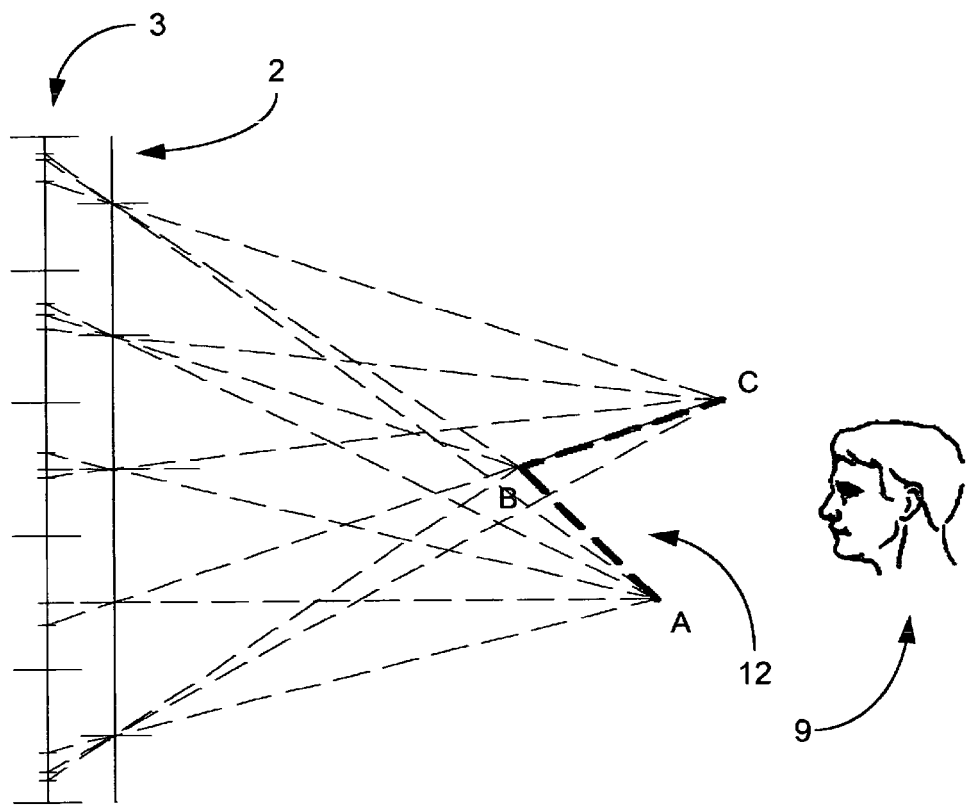
FIG. 13 is an optical ray trace schematic showing the reconstruction from an integral photograph where each elemental picture is left-right reversed, and then the order of the elemental pictures is reversed.

Finally, FIG. 13 is an optical ray trace schematic showing the reconstruction from an integral photograph where each elemental picture is left-right reversed, and then the order of the elemental pictures is reversed. This produces a pseudoscopic real image with the correct left-right orientation. The image produced here is identical to that reconstructed in FIG. 9.

FIGS. 9 through 13 have been included here as a proof of concept for the method of eversion shown in FIG. 8 and described herein. The only rearrangement methods which reconstruct a correct orthoscopic image are shown in FIGS. 8, 11, and 12. Ultimately, the final integral photographs produced by the methods of FIG. 11 and FIG. 12 are identical. This must be true since, were they to be different, the same reconstruction of the image could not occur.

Clearly, this method for image eversion can be accomplished by post processing. Photographic processing is now almost completely digital. It is a simple process for a computer to reverse the order of the elemental images of the first integral photograph of FIG. 8(*a*) to produce the second integral photograph of FIG. 8(*c*). In this way, a viewer of the second integral photograph will see an image of the object that is identical to the presentation of the object to the camera. Similarly, an artist can draw a cartoon using the principle of eversion by rearrangement that would produce a correct orthoscopic virtual image. Such intermediate processing is discussed in the Claimed Priority patents and applications.

Clearly, holographic optical elements may be used instead of refractive lens arrays. A holographic optical element may be created that performs the magnification and other functions along with eversion. A single holographic optical element can be used to reverse the order of the elemental images. This is discussed in the Claimed Priority patents and applications. Accordingly, any of the holographic optical elements described therein can be fabricated in a manner so that when an integral photographic image is processed by it, the 3-dimensional image projected therefrom will be orthoscopic.

What is claimed is:

1. A method of everting a three-dimensional image reconstructed from a first integral photograph that comprises a plurality of two-dimensional elemental images, each being of the same three-dimensional subject but seen from a different viewpoint, said method comprising:
   a. reconstructing the three-dimensional image from the first integral photograph by reconstruction of the wave fronts that produce the three-dimensional image; and,
   b. reconstructing an everted image from the three-dimensional reconstruction using at least one matrix lens array by reconstruction of the wave fronts that produce the everted image.

2. The method of claim 1 wherein the matrix lens array is produced as a hologram.

3. The method of claim 1 further comprising preparing a hologram from the first integral photograph by:
   a. forming a reproducible reference beam with coherent light;
   b. illuminating the first integral photograph with coherent light from the same source;
   c. passing the coherent light resulting from illuminating the first integral photograph through a first matrix lens array, thereby reconstructing a three-dimensional image;
   d. passing the light from the three-dimensional image through a second matrix lens array comprising a plurality of image focusing elements having the same number and arrangement as the elemental images that comprise the first integral photograph;
   e. passing the light having passed through the second matrix lens array through a third matrix lens array comprising a plurality of image focusing elements having the same number and arrangement as the elemental images that comprise the first integral photograph, thereby reconstructing an everted three-dimensional image;
   f. forming an object beam from the light of the everted image; and,
   g. forming a hologram using the reference beam and the object beam.

4. The method of claim 3 wherein at least one of the three matrix lens arrays is a holographic optical element.

5. The method of claim 1 further comprising preparing a second integral photograph of the reconstruction of the three-dimensional image from the first integral photograph and using the second integral photograph in combination with the matrix lens array to reconstruct the everted image.

6. The method of claim 5 wherein the second integral photograph and the first integral photograph have the same number of elemental images, and the elemental images of both are geometrically similar in arrangement.

7. The method of claim 5 wherein a holographic optical element is used to create the second integral photograph.

8. The method of claim 5 further comprising preparing a hologram which, when illuminated with a reference beam will reconstruct an everted image by:
   a. forming a reproducible reference beam with coherent light;
   b. forming an object beam by employing the method of claim 1 to reconstruct the everted image from the second integral photograph using coherent light from the same source;
   c. forming a hologram using the reference beam and the object beam.

9. The method of claim 1 wherein the three-dimensional reconstruction from the first integral photograph is a pseudoscopic image.

10. A second integral photograph which is created from a first integral photograph, each integral photograph being comprised of elemental images wherein the order of the elemental images of the second integral photograph in the horizontal direction is the reverse of the order of the elemental images of the first integral photograph and wherein the left-right orientation of each elemental image is maintained from the first integral photograph to the second integral photograph.

11. The second integral photograph of claim 10 wherein said second integral photograph is created photographically.

12. The second integral photograph of claim 10 wherein said second integral photograph is created as a video image.

13. The second integral photograph of claim 10 wherein said second integral photograph is created as a computer image.

14. The second integral photograph of claim 10 wherein said second integral photograph is created by drawing or plotting.

15. A method of preparing the second integral photograph of claim 10 comprising:
   a) separating the elemental images of the first integral photograph; and,
   b) rearranging the elemental images in reverse order.

16. The second integral photograph of claim 10 wherein all of the elemental images are arranged in a single horizontal linear array, and wherein said second integral photograph reconstructs a three-dimensional image displaying only horizontal parallax.

* * * * *